(12) United States Patent  (10) Patent No.: US 6,988,293 B2
Ritter  (45) Date of Patent: Jan. 24, 2006

(54) LEAF COLLECTION SYSTEM FOR A LAWN BLOWER/VACUUM

(76) Inventor: Joseph K. Ritter, 161 S. Broadway, Cassopolis, MI (US) 49031

( * ) Notice: Subject to any disclaimer, the term of this patent is extended or adjusted under 35 U.S.C. 154(b) by 400 days.

(21) Appl. No.: 10/429,406

(22) Filed: May 6, 2003

(65) Prior Publication Data

US 2004/0221416 A1  Nov. 11, 2004

(51) Int. Cl.
*A47L 9/10* (2006.01)
*E01H 1/08* (2006.01)

(52) U.S. Cl. .......................... 15/347; 15/330; 15/344; 15/340.2; 55/DIG. 2; 55/364; 55/366

(58) Field of Classification Search .................. 15/330, 15/347, 344, 345, 409, 340.2; 55/DIG. 2, 55/364, 366; D32/21, 22, 24, 31, 34
See application file for complete search history.

(56) References Cited

U.S. PATENT DOCUMENTS

| | | | | |
|---|---|---|---|---|
| 2,225,389 A | * | 12/1940 | Osterdahl | 55/376 |
| 2,564,845 A | * | 8/1951 | Holt, Jr. | 55/493 |
| 3,421,302 A | * | 1/1969 | Dahl | 56/202 |
| 3,618,157 A | * | 11/1971 | Bassin | 15/330 |
| 3,903,565 A | * | 9/1975 | Hicks | 15/352 |
| 4,567,623 A | * | 2/1986 | Walton | 15/337 |
| 4,644,606 A | * | 2/1987 | Luerken et al. | 15/330 |
| 5,245,726 A | * | 9/1993 | Rote et al. | 15/339 |

* cited by examiner

*Primary Examiner*—Terrence R. Till
(74) *Attorney, Agent, or Firm*—R. Tracy Crump

(57) ABSTRACT

A leaf collection system for lawn blower/vacuums is disclosed. The collection system includes a port coupling fitted to the exhaust port of a blower/vacuum, a dust cover, and a unique disposable collection bag. The disposable collection bag is constructed of an environmentally friendly, biodegradeable plastic that will quickly decompose along with the organic leaves and lawn debris collected therein. Both sides of the collection bag has several rows of T-shaped slits and two rows of straight or I-shaped slits that allow air to escape from the bag but retain the leaves and lawn debris deposited therein. The collection bag is shaped to fit inside the dust cover that is fixed to the port coupling. The port coupling includes an elastic lock ring that secures the collection bag to the coupling. The dust cover envelops of the collection bag and shields the operator from the dust that passes through the collection bag.

8 Claims, 3 Drawing Sheets

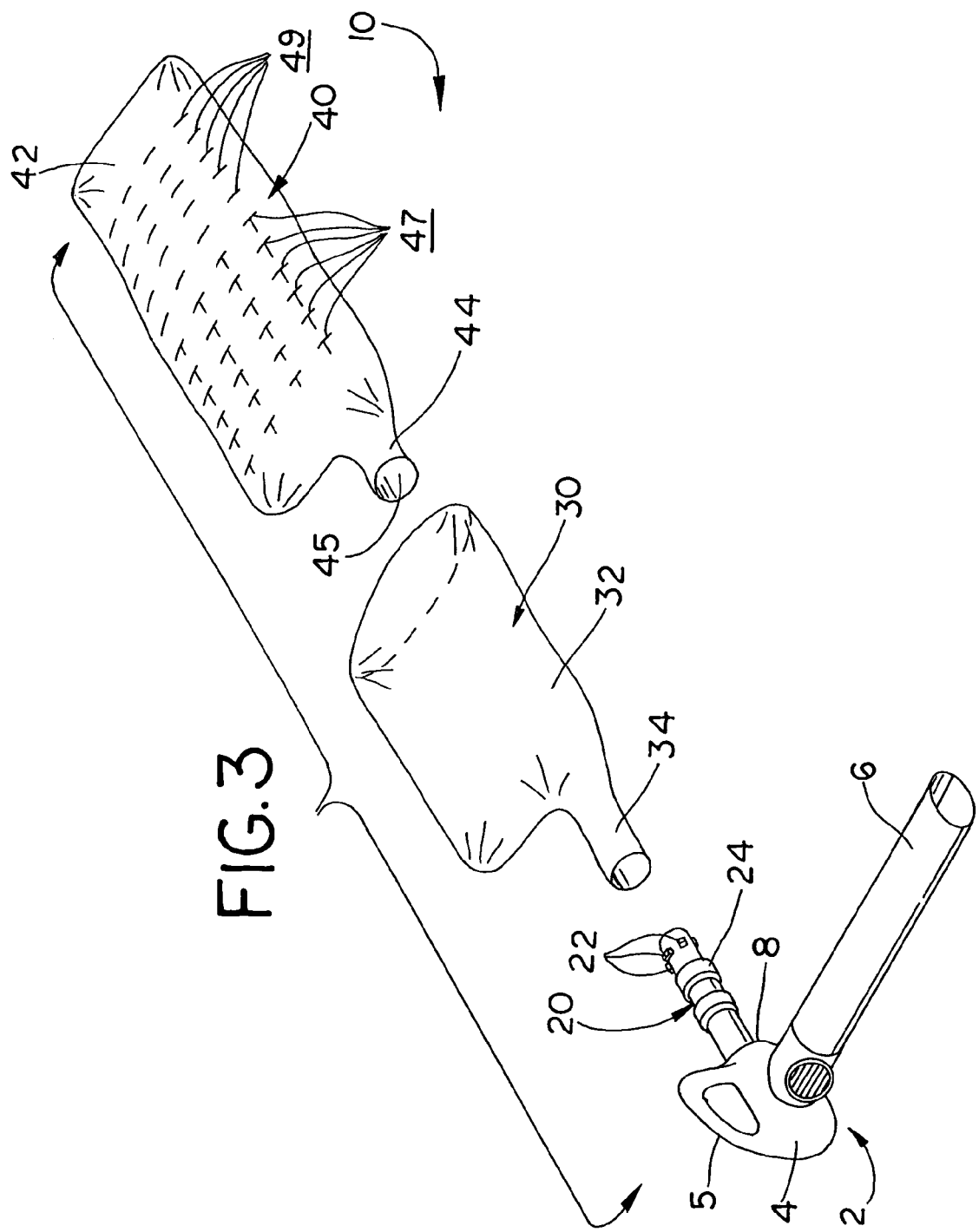

LEAF COLLECTION SYSTEM FOR A LAWN BLOWER/VACUUM

This invention relates to lawn blower/vacuums and in particular, a leaf collection system with disposable collection bags for a lawn blower/vacuum.

BACKGROUND OF THE INVENTION

Lawn blower/vacuums have become a convenient lawn care tool. Blower/vacuums are particularly valuable in the fall season for leaf collection and constitute a significant improvement over the common lawn rake for leaf collection. Blowers are commonly used to blow the leaves into piles for collection. Conventional blower also include a vacuum feature that can vacuum leaves in a collection bag. The blower/vacuum can be switched to blow the leaves into a pile, then switched to vacuum the leaves into a collection bag. Conventional blower/vacuums use an electric or gas motor that propels a bladed fan that generates the stream of air to blow the fallen leaves or the vacuum force to collect the lawn debris.

Heretofore, the conventional collection bags have been heavy cloth sacks attached to the exhaust port of the blower/vacuums. The cloth collection bags must allow air flow to escape while retaining the leaves and lawn debris collected therein. While the cloth collection bags retain most of the leaves and debris, annoying dust is expelled from the cloth bags. Consequently, operators often need masks and goggles to operate the blower/vacuum and even with such protection, the operator is generally covered in the dust from the collection bag. Another drawback of the conventional blower/vacuums is that the leaves collected in the collection bag must be transferred to another container for disposal. Often the leaves are transferred from the cloth collection bag to a disposable lawn trash bag. For further convenience, it would be a desirable time and labor saving feature to vacuum and collect leaves directly into disposable lawn trash bags using a lawn blower/vacuum.

SUMMARY OF THE INVENTION

The leaf collection system of this invention provides an environmentally friendly and labor saving alternative to conventional collection bags for conventional lawn blower/vacuums. The apparatus of the leaf collection system includes a port coupling, a dust cover, and a unique disposable collection bag. The port coupling mates to the side port of blower/vacuum and has a plurality of nubs that protrude radially around the distal end of the coupling. The disposable collection bag is constructed of an environmentally friendly, bio-degradeable plastic that will quickly decompose along with the organic leaves and lawn debris collected therein. Both sides of the collection bag have several rows of T-shaped slits and two rows of straight or I-shaped slits that allow air to escape from the bag but retain the leaves and lawn debris deposited therein. The collection bag is shaped to fit inside the dust cover that is fixed to the port coupling. The dust cover envelops the collection bag and shields the operator from the dust that passes through the collection bag.

Accordingly, an advantage of this invention is that the leaf collection system provides an environmentally friendly and labor saving alternative to conventional collection bags for conventional lawn blower/vacuums.

Another advantage of this invention is that the leaf collection system is designed to be used with the most common conventional lawn blower/vacuum.

Another advantage of this invention is that the collection bags are constructed of a light bio-degradeable material for convenient disposal and composting purposes.

Another advantage of this invention is that the dust cover shields the operator from dust expelled from the collection bag.

Another advantage of this invention is that the T-shaped and I-shaped slits are oriented to provide a sturdy collection vessel while providing sufficient air flow conduits for the flow rates of most conventional blower/vacuums.

Other advantages will become apparent upon a reading of the following description.

BRIEF DESCRIPTION OF THE DRAWINGS

A preferred embodiment of the invention has been depicted for illustrative purposes only wherein:

FIG. 3 is an exploded view of the collection apparatus of this invention.

DESCRIPTION OF THE PREFERRED EMBODIMENT

Figure 1:
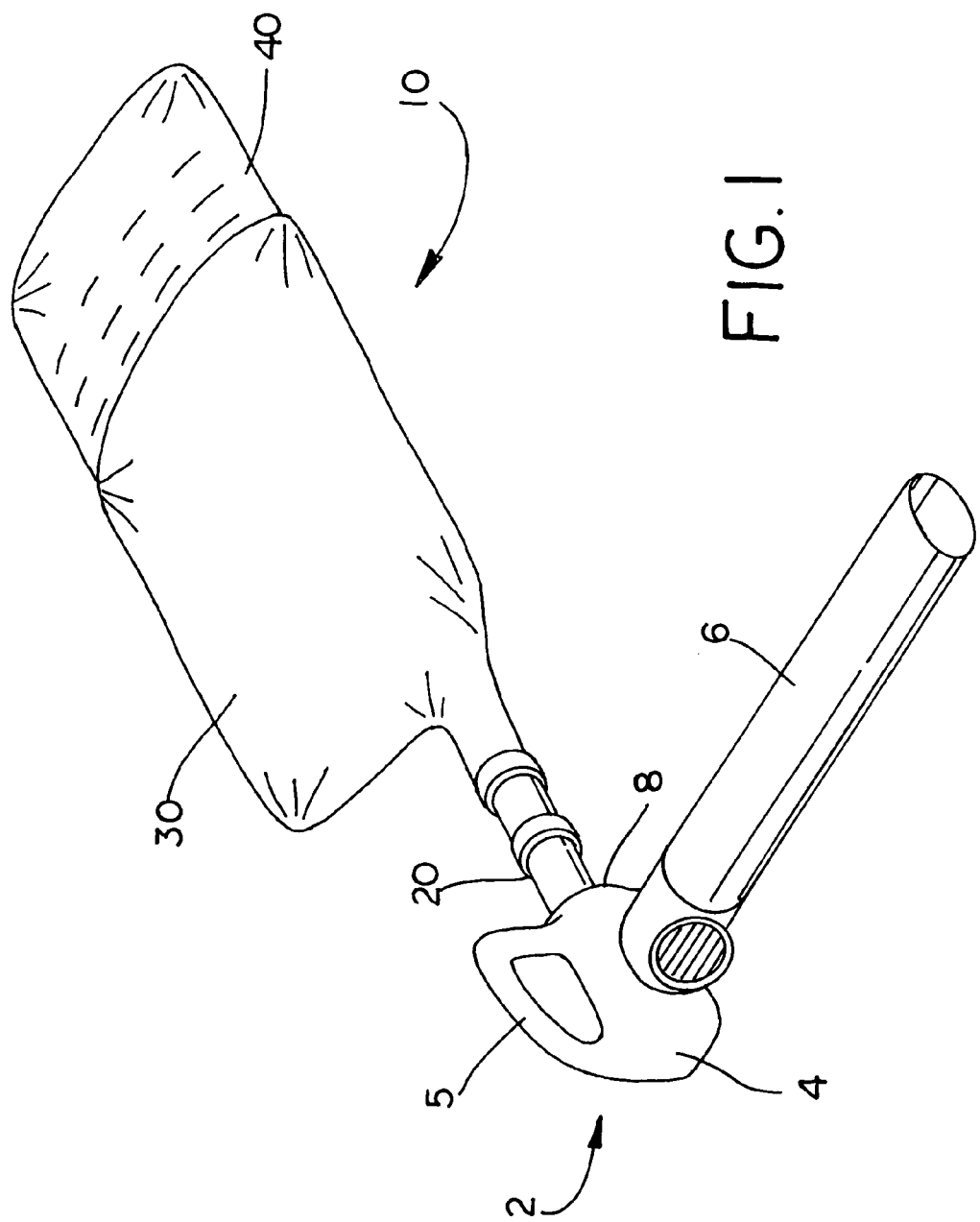
FIG. 1 is a perspective view of the leaf collection apparatus of this invention mounted to a conventional lawn blower/vacuum.
Figure 2:
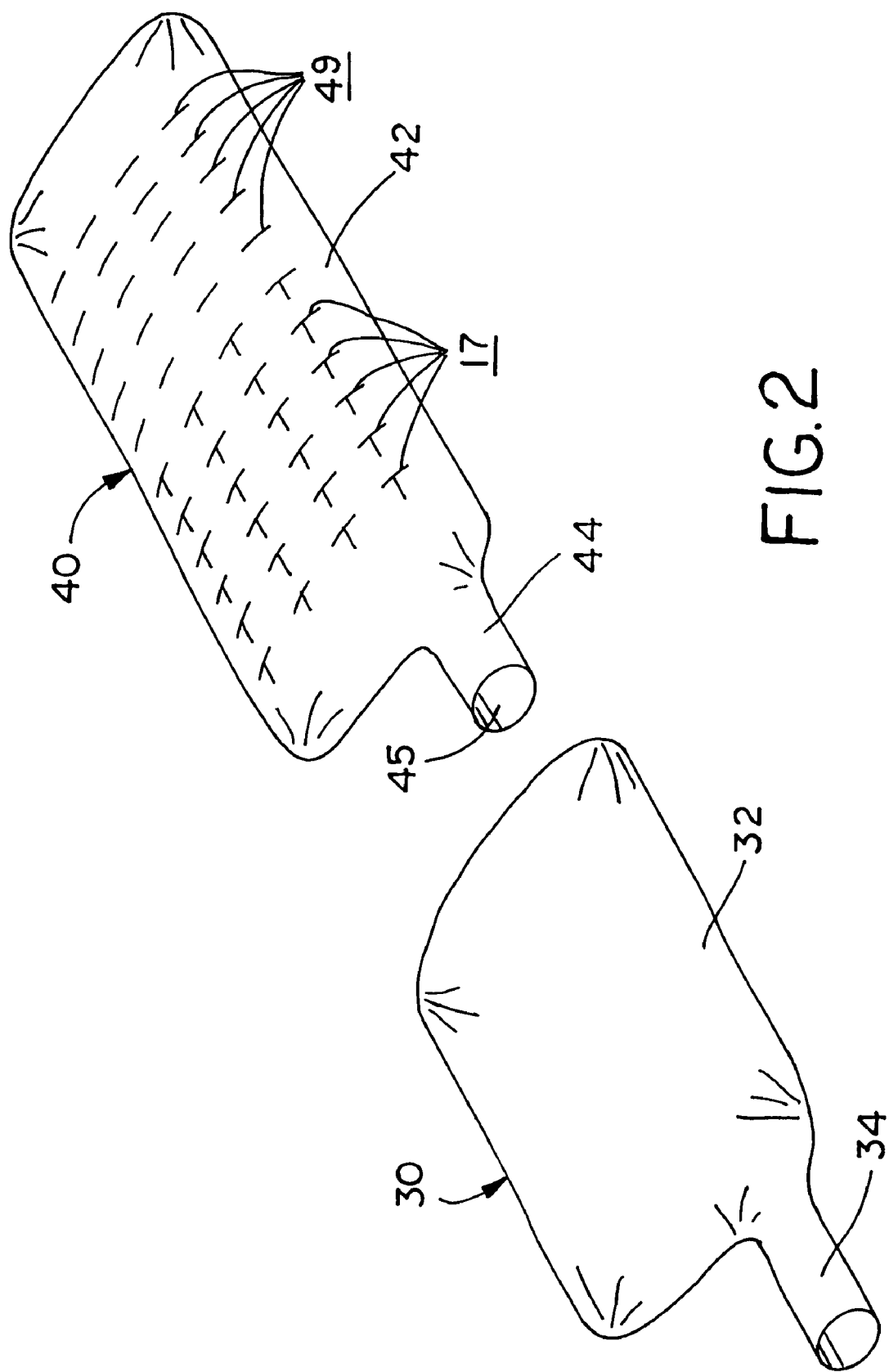
FIG. 2 is a partial exploded view of the collection bag and dust cover of the leaf collection apparatus of this invention.

The preferred embodiment herein described is not intended to be exhaustive or to limit the invention to the precise form disclosed. It is chosen and described to best explain the invention so that others skilled in the art might utilize its teachings.

In the figures, the apparatus of the collection system of this invention is designated generally as reference numeral 10 and the blower/vacuum is designated generally as reference numeral 2. Blower/vacuum 2 is illustrated as having a conventional design that uses a bladed fan that generates both the positive pressure air flow and the negative pressure vacuum. The bladed fan is driven by either an electric or gas motor (not shown). The motor and fan are enclosed in a housing 4 that includes a handle 5. A long nozzle 6 and a side port 8 extend from housing 4. In the blower mode, the fan draws air in through side port 8 and expels it through nozzle 6. In a suction mode, the fan draws leaves and debris through nozzle 6 and expels then through side port 8. Blower/vacuum 2 can be operated in both a blower mode where an air stream is generated to blow leaves and lawn debris and a vacuum mode, where a negative vacuum pressure is generated to suction up leaves and lawn debris.

As shown, the apparatus of collection system 10 includes a port coupling 20, a dust cover 30, and a disposable collection bag 40. Collection system 10 is designed and intended for use with any conventional blower/vacuum having an air flow rate of approximately 350 cubic feet per minute (cfm), but can be used with any blower/vacuum having an air flow rate range of 250–450 cfm. Port coupling 20 and dust cover 30 are fixedly mounted to blower/vacuum 2. Collection bags are fitted inside the dust cover and connected to port coupling 20 to collect the leaves and debris and are intended to be disposable.

Port coupling 20 is a tubular fitting constructed of a plastic material, such as polyvinyl chloride (PVC). Port Coupling 20 mates to side port 8 of blower/vacuum 2. Ideally, port coupling 20 threads into side port 8, but may be connected by any suitable method. Port Coupling 20 has a plurality of nubs 22 that product radial around the distal end of the coupling. As shown, a lock ring or sleeve 24 is shiftably fitted over port coupling 20 between nubs 22 and side port 8, which is used to secure dust cover 30 and collection bag 40 to the distal end of port coupling 20. Ideally, lock ring 24 is constructed of a thick elastic and pliable material such as a rubber or silicone.

Dust cover 30 is constructed of a non-porous fabric material, such as a vinyl cloth or other such material that prevents air flow therethrough. The body of dust cover 30 is shaped as illustrated in the figures and has a rectangular body 32 and a neck 34. The mouth of neck 34 is bonded to port coupling 20.

Ideally, disposable collection bag 40 is constructed of an environmentally friendly, bio-degradeable plastic that will quickly decompose along with the organic leaves and lawn debris collected therein. Collection bag 40 can be formed using conventional thermoplastic bag forming techniques well known in the art. Collection bag 40 is shaped and conformed to the inside of dust cover 30. In an unfilled state, collection bag 40 has a flat body 42 formed of two thin sheets of material which defines an interior therein and a neck 44 with an opening mouth 45. Both sides of collection bag 40 have a plurality of T-shaped slits 47 and straight or I-shaped slits 49. T-shaped slits 47 are positioned in a number of rows of four starting at the proximal end of the bag. Each T-shaped slit 47 is approximately four inches long and one inches wide. I-shaped slits 49 are also positioned in the last two rows at the distal end of the bag. Each I-shaped slit 49 is approximately two inches long. As illustrated in FIGS. 1 and 3, collection bag 40 is seated within the open end of dust cover 30 and connected to port coupling 20. Neck 44 of collection bag 40 is placed over port coupling 20 and lock ring 24 is slid down to cover the neck of the collection bag which is secured by the friction engagement of the lock ring about nubs 22.

In operation, blower/vacuum 2 suctions leaves and lawn debris through nozzle 6 and expels them through side port 8 in the collection bag 40. The air flow from the blower/vacuum that blows the leaves and debris into collection bag 40 escapes through slits 47 and 49. The shape and dimension of slits 47 and 49 prevent the collected leaves and debris from escaping but allow sufficient air flow to exit collection bag 40. As leaves and debris are suctioned, collection bag 40 fills from the distal end forward to the proximal end. I-shaped slits 49 are used in the last two rows to provide more structural integrity, while T-shaped slits 47 allow more air to escape near the proximal end of the bag. Dust cover 30 creates dust and small leaf fragments that do pass through slits 47 and 49 away from the operator. Air flow passes through slits 47 and 49 passes between the sides of dust cover 30 and collection bag 40 and exits to the atmosphere out the open end of dust cover 30. One skilled in the art will note several advantages of the collection apparatus of this invention over conventional collection bags for lawn blower/vacuums. The collection bags provide an environmentally friendly as well as labor saving alternative to conventional collection bags. The collection apparatus is designed to be used with the most common conventional lawn blower/vacuum. The port coupling can be adapted to mate with the side ports of conventional blower/vacuums with little to no modification. The collection bags are constructed of a light bio-degradeable material for convenient disposal and composting purposes. Once full, the collection bags can be removed from the blower/vacuum, the neck tied off and set out for refuse pick up or composting. The dust cover envelops the collection bag and shields the operator from dust. The T-shaped and I-shaped slits are oriented to provide a sturdy collection vessel while providing sufficient air flow conduits for the flow rates of most conventional blower/vacuums.

It is understood that the above description does not limit the invention to the details given, but may be modified within the scope of the following claims.

I claim:

1. A collection apparatus for a lawn blower/vacuum for collecting leaves and small lawn debris where the blower/vacuum includes an elongated nozzle through which leaves are suctioned into the blower/vacuum and an exhaust port through which the leaves are expelled, the collection apparatus comprising:
    a port coupling adaptable for connection to the exhaust port of the blower/vacuum;
    a pliable dust cover connected to the port coupling and having an interior defined therein,
    a collection bag adapted for connection to the port coupling and disposed within the dust cover interior, the collection bag defining an interior therein for collecting the leaves and lawn debris therein and having a plurality of T-shaped slit openings and a plurality of I-shaped slit openings, the plurality of T-shaped slit openings and the plurality of I-shaped slit openings constituting means for allowing air force into the bag interior from the blower/vacuum to escape while retaining the leaves forced into the bag interior from the blower/vacuum; and
    means for securing the collection bag and dust cover to the port coupling.

2. The collection apparatus of claim 1 wherein the collection bag includes a neck having an open mouth into the collection bag interior and is adapted to seat around the port coupling.

3. The collection apparatus of claim 2 wherein the collection bag is constructed of a bio-degradeable material.

4. The collection apparatus of claim 2 wherein the collection bag includes a rectangular body having a proximal end and a distal end, the neck extending from the proximal end of the collection bag body.

5. The collection apparatus of claim 4 wherein the plurality of I-shaped slit openings are arranged and located near the distal end of the collection bag, the plurality of the T-shaped slit openings are arranged and located near the proximal end of the collection bag body between the neck and the plurality of I-shaped slit openings.

6. The collection apparatus of claim 2 wherein the port coupling includes a tubular body and a raised nub protruding radially from the tubular body, the securing means includes an elastic ring concentrically journalled around the tubular body over the nub such that the ring presses the neck of the collection bag against the nub and tubular body when the neck is seated over the port coupling.

7. The collection apparatus of claim 2 wherein the dust cover has a rectangular body and a neck mounted to and seated around the port coupling.

8. A collection apparatus for a lawn blower/vacuum for collecting leaves and small lawn debris where the blower/vacuum includes an elongated nozzle through which leaves are suctioned into the blower/vacuum and an exhaust port through which the leaves are expelled, the collection apparatus comprising:
    a port coupling adaptable for connection to the exhaust port of the blower/vacuum, the port coupling includes a tubular body and a raised nub protruding radially from the tubular body;

a pliable rectangular dust cover connected to the port coupling, the dust cover constructed of a non-porous material and having an interior defined therein, a collection bag adapted for connection to the port coupling and disposed within the dust cover interior, the collection bag includes a rectangular body having a proximal end and a distal end and defining an interior therein for collecting the leaves and lawn debris therein, the collection bag further includes a neck extending from the collection bag body having an open mouth into the collection bag interior and adapted to seat around the port coupling, the collection bag body also having a plurality of I-shaped slit openings arranged and located near the distal end of the collection bag, and a plurality of T-shaped slit openings arranged and located near the proximal end of the collection bag body between the neck and the plurality of I-shaped slits, the plurality of I-shaped slit openings and the plurality of T-shaped slit openings constituting means for allowing air force into the bag interior from the blower/vacuum to escape while retaining the leaves forced into the bag interior from the blower/vacuum; and an elastic ring concentrically journalled around the tubular body over the nub such that the ring presses the collection bag neck against the nub and tubular body when the neck is seated over the port coupling for securing the collection bag to the port coupling.

* * * * *